(12) United States Patent
Knoller

(10) Patent No.: US 11,364,907 B2
(45) Date of Patent: *Jun. 21, 2022

(54) LONGITUDINALLY GUIDING DRIVER ASSISTANCE SYSTEM IN A MOTOR VEHICLE

(71) Applicant: Bayerische Motoren Werke Aktiengesellschaft, Munich (DE)

(72) Inventor: Stefan Knoller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 207 days.

This patent is subject to a terminal disclaimer.

(21) Appl. No.: 15/784,779

(22) Filed: Oct. 16, 2017

(65) Prior Publication Data

US 2018/0037225 A1 Feb. 8, 2018

Related U.S. Application Data

(63) Continuation of application No. PCT/EP2016/057988, filed on Apr. 12, 2016.

(30) Foreign Application Priority Data

Apr. 17, 2015 (DE) ...................... 10 2015 207 053.0
Jul. 14, 2015 (DE) ...................... 10 2015 213 185.8

(51) Int. Cl.
*B60W 30/14* (2006.01)
*B60W 50/00* (2006.01)
(Continued)

(52) U.S. Cl.
CPC ........ *B60W 30/146* (2013.01); *B60W 30/143* (2013.01); *B60W 50/0097* (2013.01);
(Continued)

(58) Field of Classification Search
CPC ..... B60W 2050/146; B60W 2420/403; B60W 2420/42; B60W 2550/22;
(Continued)

(56) References Cited

U.S. PATENT DOCUMENTS

| | | |
|---|---|---|
| 2012/0253628 A1 | 10/2012 | Maruyama |
| 2013/0138319 A1 | 5/2013 | Schuberth et al. |
| 2014/0244150 A1 | 8/2014 | Boesch et al. |

FOREIGN PATENT DOCUMENTS

| | | |
|---|---|---|
| CN | 102729995 A | 10/2012 |
| CN | 102795224 A | 11/2012 |

(Continued)

OTHER PUBLICATIONS

Chinese-language Office Action issued in counterpart Chinese Application No. 201680022297.9 dated Apr. 25, 2019 with English translation (14 pages).

(Continued)

*Primary Examiner* — Charles J Han
(74) *Attorney, Agent, or Firm* — Crowell & Moring LLP

(57) ABSTRACT

A driver assistance system in a motor vehicle takes into consideration a target speed, in particular in order to regulate the speed at a specified target speed, and includes a detection system for detecting upcoming events which require an adaptation of the target speed; a functional unit which triggers a request notification output to approve an automatic adaptation of the target speed to a new target speed at a defined point in time when an upcoming event is detected that requires an adaptation of the target speed; a notification system for outputting the request notification to the driver after the defined point in time; and an operating element which is designed to allow a clearance to approve the automatic adaptation to the new target speed when the request notification has been output and the operating element has been actuated. In response to the clearance, the (Continued)

functional unit automatically triggers the adaptation of the target speed to the new target speed. The operating element is additionally designed to request a manual target speed influence which differs from the automatic target speed adaptation approval at a point in time when no request notifications to approve an automatic adaptation of the target speed have been triggered.

6 Claims, 1 Drawing Sheet

(51) Int. Cl.
*B60W 50/08* (2020.01)
*B60W 50/14* (2020.01)

(52) U.S. Cl.
CPC .......... *B60W 50/085* (2013.01); *B60W 50/14* (2013.01); *B60W 2050/146* (2013.01); *B60W 2420/403* (2013.01); *B60W 2420/42* (2013.01); *B60W 2555/60* (2020.02); *B60W 2556/50* (2020.02)

(58) Field of Classification Search
CPC ......... B60W 2550/402; B60W 30/143; B60W 30/146; B60W 50/0097; B60W 50/085; B60W 50/14
See application file for complete search history.

(56) References Cited

FOREIGN PATENT DOCUMENTS

| | | | |
|---|---|---|---|
| CN | 104015730 A | 9/2014 | |
| CN | 104369737 A | 2/2015 | |
| DE | 10 2007 005 245 A1 | 11/2007 | |
| DE | 102007005245 A1 * | 11/2007 | ............ B60W 30/16 |
| DE | 10 2008 018 421 A1 | 9/2009 | |
| DE | 10 2012 102 564 A1 | 10/2012 | |
| DE | 10 2012 211 967 A1 | 1/2014 | |
| DE | 10 2013 011 538 A1 | 1/2015 | |
| DE | 10 2014 215 673 A1 | 2/2016 | |
| EP | 2 803 521 A2 | 11/2014 | |
| JP | 2015-51683 A | 3/2015 | |

OTHER PUBLICATIONS

International Search Report (PCT/ISA/210) issued in PCT Application No. PCT/EP2016/057998 dated Jul. 4, 2016 with English translation (seven pages).
German-language Written Opinion (PCT/ISA/237) issued in PCT Application No. PCT/EP2016/057998 dated Jul. 4, 2016 (seven pages).
German-language Office Action issued in counterpart German Application No. 10 2015 213 185.8 dated Nov. 19, 2015 (four pages).
Chinese Office Action issued in Chinese counterpart application No. 201680022297.9 dated Dec. 12, 2019 (Seven (7) pages).

* cited by examiner

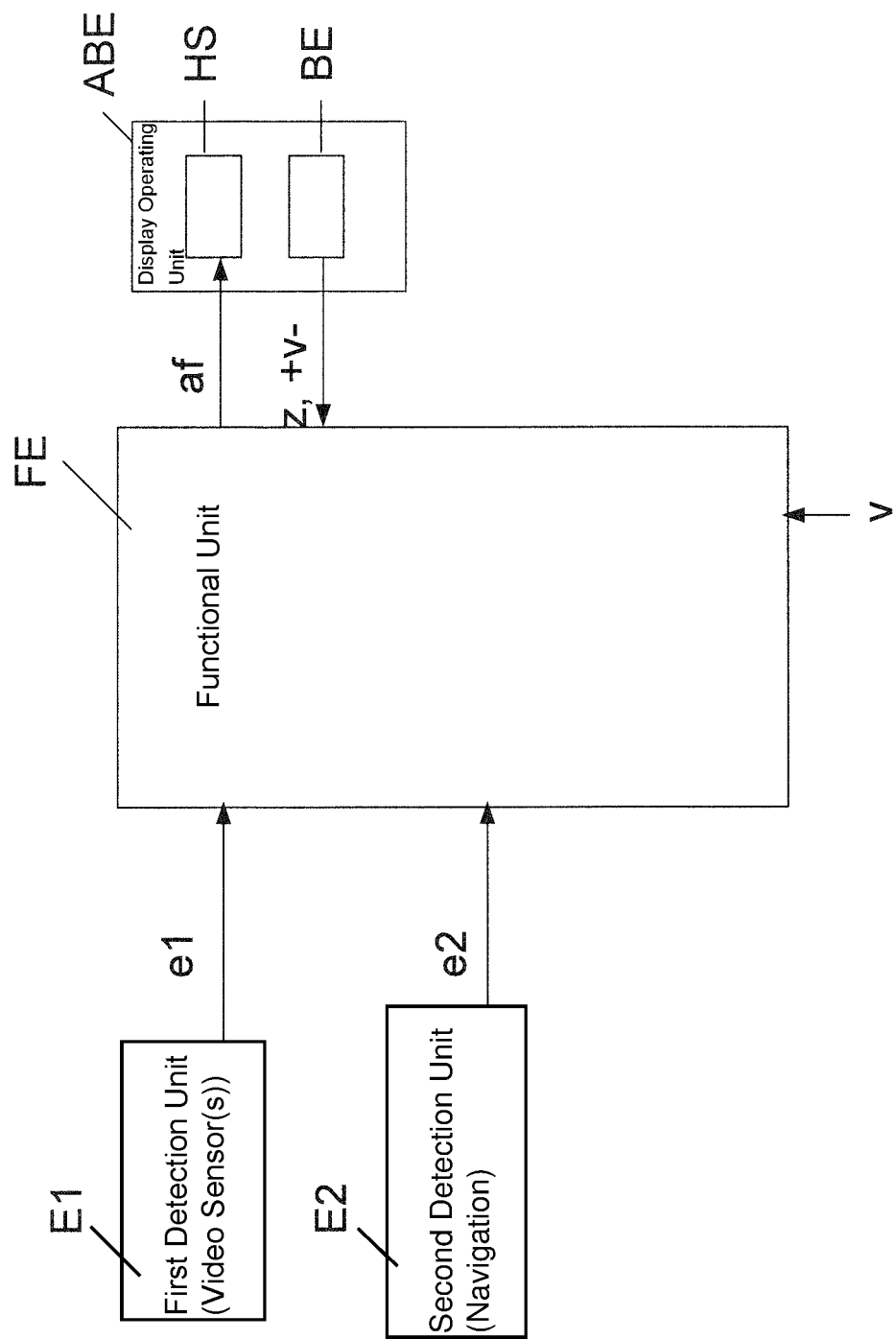

LONGITUDINALLY GUIDING DRIVER ASSISTANCE SYSTEM IN A MOTOR VEHICLE

CROSS REFERENCE TO RELATED APPLICATIONS

This application is a continuation of PCT International Application No. PCT/EP2016/057998, filed Apr. 12, 2016, which claims priorities under 35 U.S.C. § 119 from German Patent Applications Nos. 10 2015 207 053.0, filed Apr. 17, 2015, and 10 2015 213 185.8, filed Jul. 14, 2015, the entire disclosures of which are herein expressly incorporated by reference.

This application contains subject matter related to U.S. application Ser. No. 15/782,245, entitled "Longitudinally Guiding Driver Assistance System in a Motor Vehicle" filed on Oct. 12, 2017.

BACKGROUND AND SUMMARY OF THE INVENTION

The invention relates to a longitudinally guiding driver assistance system in a motor vehicle for controlling or regulating the speed taking into account a maximum speed.

In principle, many driver assistance systems, which are in the form of speed regulation systems and regulate the speed of the motor vehicle to a predefined desired or maximum speed, are already known. In addition to these longitudinal regulation systems, longitudinal regulation systems enhanced with distance regulation, so-called distance-based longitudinal regulation systems, or speed regulation systems, can also nowadays already be purchased from some manufacturers. Such systems (for example, offered by the Applicant of the present patent application under the name "active cruise control") make it possible to automatically guide the motor vehicle at a desired or accordingly lower speed while complying with a desired distance from a vehicle traveling in front. If a distance sensor system which is fitted to the motor vehicle and can operate, in particular, on a radar basis detects a target object or (motor) vehicle traveling in front in its own lane, its own speed is adapted—for example by causing a suitable braking torque—to the speed of the motor vehicle traveling in front or of the target object such that distance regulation included in the "active travel speed regulation" or in the corresponding longitudinal regulation system automatically adjusts and complies with a distance from the motor vehicle or target object traveling in front which is appropriate to the situation.

Longitudinally guiding driver assistance systems which are in the form of so-called speed restriction systems and prevent the speed set by the driver from being exceeded by accordingly controlling the speed are also known.

DE 10 2012 211 967 A1 describes a combination of a speed restriction system and a speed regulation system. The maximum speed of the speed restriction system is able to be adopted, instead of the selected set speed, as the (new) desired or target speed for the speed regulation.

Finally, recent vehicles also contain driver assistance systems which predictively identify a speed restriction either from map data from a navigation system and/or by means of image processing and can permanently display this to the driver after reaching the speed restriction, with the result that the driver can independently adapt his speed to the speed restriction if necessary (for example BMW Speed Limit Info).

DE 10 2008 018 421 A1 discloses a driver assistance system for transmitting and receiving speed data and/or traffic density data for controlling a speed regulation system which determines a permissible maximum speed on the basis of the received data and communicates this to the driver by outputting a corresponding notification. The driver can adopt this specification of the permissible speed for his speed regulation system by means of simple actuation.

DE 10 2014 215 673 A1, which is still unpublished, likewise discloses a longitudinally guiding driver assistance system which determines a deceleration strategy, if an upcoming event which requires a speed reduction is identified, and, at a defined time before reaching the event, outputs a request notification to the driver for permitting the automatic implementation of the deceleration strategy. If the driver actuates the request notification, automatic implementation of the deceleration strategy is initiated.

The object of the invention is to provide an improved longitudinally guiding driver assistance system which assists the driver, in particular, with the longitudinal guidance by way of simple operating logic without restricting the guidance task or manual handling instructions of the driver.

This and other objects are achieved by a driver assistance system according to the invention for controlling or regulating the speed taking into account a maximum speed, in particular for regulating the speed to a predefined maximum speed. The system comprises a detection system for identifying upcoming events which require an adjustment of the permissible maximum speed, a functional unit which, if an upcoming event which requires an adjustment of the permissible maximum speed is identified, causes output of a request notification to permit an automatic adjustment of the maximum speed to a new maximum speed at a defined time, in particular at a defined time before the upcoming event is reached, and a notification system for outputting the request notification to the driver. The functional unit causes the automatic implementation of the adjustment of the maximum speed only if the driver confirms or permits the automatic adjustment of the maximum speed to a new maximum speed by accordingly actuating an operating element provided for this purpose upon output of the request notification. With the request notification, it is simultaneously possible to produce a display which indicates to the driver what the new maximum speed would be at the location of the relevant event.

The relevant upcoming events which require an adjustment of the maximum speed may be identified either from map data from a navigation system and/or by way of image processing by a predictive sensor system and/or by way of a car-to-X communication unit by receiving relevant data from other vehicles or from traffic signs or traffic control systems. The upcoming events may therefore be, for example, temporary or permanent speed restrictions which are either directly indicated on a traffic sign or can be derived therefrom on the basis of the general traffic rules (for example, there is a speed restriction to 50 km/h when passing through a town in Germany). The event may likewise also be an event which eliminates a speed restriction or at least an event which causes an increase to a new maximum speed, as is usually the case when leaving a town, for example.

The (new) maximum speed which is relevant to the longitudinally guiding speed system at the location of the upcoming event can be either the actually predefined new speed restriction or a speed which differs upward or downward from the predefined new speed restriction by a predefined amount, in which case the amount and direction of the difference can be set by the driver in a central vehicle menu, for example. This new maximum speed can be directly transmitted to the functional unit or can only be determined on the basis of the available information in the functional unit.

Alternatively or additionally, it is also possible for the driver himself to stipulate speed limits in a location-based manner on a route known to him using an interface inside or outside the vehicle. When driving along the route with an active longitudinal guidance system, these speed limits can be accordingly taken into account as new maximum speeds. In this case, the driver can also select in advance, for example, whether he fundamentally wishes to have all speed limits stipulated by himself taken into account or speed limits selected according to a rule (for example only on a particular route, for particular road classes, at a particular time, depending on weather conditions, etc.). It is also possible to create a plurality of speed profiles for a particular route section which are then active according to predefined rules (speed profile for good road conditions, speed profile for wet roads and/or speed profile for snow-covered roads).

The driver assistance system according to the invention is also distinguished by the fact that the above-mentioned operating element, upon the actuation of which the driver can permit the automatic adjustment of the maximum speed to a new maximum speed upon output of the request notification, is designed in such a manner that the driver can request manual influencing of the maximum speed, which differs from the permission to adjust the maximum speed, at a time at which no request notification for permitting the automatic adjustment of the maximum speed is output. Therefore, if there is no offer to automatically adjust the maximum speed, the operating apparatus serves a different purpose, to be precise as an adjustment device for manually adjusting the maximum or desired speed.

In one advantageous configuration, the operating element may also be configured, for example, in such a manner that at least two different types of actuation or directions of actuation (for example a rocker which can be actuated in at least two directions) can be performed. If the request notification is output, the driver can permit (first direction of actuation) or actively reject (second direction of actuation) the automatic adjustment of the maximum speed depending on the type of actuation. If the driver actively rejects the automatic adjustment of the maximum speed by appropriately actuating the operating element, the functional unit can cause the request notification to be withdrawn. If no request notification is output, a manual increase in the maximum speed can be requested with actuation according to the first type of actuation and a manual reduction in the maximum speed can be requested with actuation according to the second type of actuation.

The invention is now based on the following knowledge: if the driver actuates the operating element in the sense of the original meaning (that is to say in the meaning when no request notification is output), the situation may occur in which the driver unwittingly accepts the offer to automatically adjust the maximum speed—because the request notification is output at the same time or only upon the actuation of the operating element—or—with appropriate configuration of the operating element (see comments above on the configuration of the operating element as a rocker)—rejects the offer even though he does not want to.

Therefore, one advantageous development of the invention provides for the functional unit to be configured to suppress the output of the request notification at the defined time if actuation of the operating element for influencing the regulation of the speed in a different manner, in particular for manually influencing the maximum speed, is detected at the defined time, that is to say the offer and its display for permitting an automatic adjustment of the maximum speed are suppressed.

The functional unit may be advantageously also configured to suppress the output of the request notification at the defined time if actuation of the operating element for manually influencing the maximum speed is detected at the defined time and to cause the output of the request notification only after the actuation of the operating element has been concluded. In this case, the functional unit can cause the output of the request notification directly after the actuation of the operating element has been concluded or only after the expiry of a defined interval of time after the actuation of the operating element has been concluded. In this case, the interval of time after which the request notification is output can be permanently defined or can be variable on the basis of predefined parameters.

In this case, the functional unit may be advantageously also configured to cause the output of the request notification after the actuation of the operating element has been concluded, in particular at a defined second time after the actuation of the operating element has been concluded, only when predefined prerequisite conditions have been met. The output of the request notification can therefore be completely prevented if it can be discerned, on the basis of an action by the driver, that he presumably does not want any automatic adjustment of the maximum speed to the new maximum speed at the current time.

In order to prevent the problem mentioned at the outset of the driver inadvertently "requesting" an automatic adjustment of the maximum speed, the functional unit may also be set up in a particularly advantageous configuration of the invention to not cause the automatic adjustment of the maximum speed upon output of the request notification and actuation of the operating element if the output of the request notification and the actuation of the operating element are started at the same time or virtually at the same time. In other words, the automatic adjustment of the maximum speed is not caused when manual actuation of the operating element is determined immediately before, at the same time as or immediately after activation of the request notification. However, the period should be selected to be very short in order to prevent the situation in which, in the event of desired acceptance of the request, this acceptance is not executed. The period between activation of the request notification and first possible actuation, during which the automatic adjustment is carried out, is ideally less than 1 second, advantageously only approximately 600 ms.

Other objects, advantages and novel features of the present invention will become apparent from the following detailed description of one or more preferred embodiments when considered in conjunction with the accompanying drawing.

BRIEF DESCRIPTION OF THE DRAWING

The single FIG. 1 shows a first exemplary structure of a speed regulation system in a motor vehicle for regulating the speed to a maximum speed.

DETAILED DESCRIPTION OF THE DRAWING

FIG. 1 shows in detail, as a central element of the driver assistance system, a functional unit FE which receives input signals e1 from a first detection unit E1, input signals e2 from a second detection unit E2, a speed signal v, a permission signal z for permitting an automatic adjustment of the maximum speed, and a signal +v− for manually adjusting the maximum speed. The functional unit may be implemented in hardware, software or a combination of both, such as a microprocessor that executes program code.

The first detection unit E1 may be, for example, a (for example video) sensor system which is fitted to the vehicle, is oriented to the front and identifies upcoming speed-restricting events which possibly require an adjustment of the maximum speed to a new maximum speed. The second detection unit E2 may be, for example, a navigation system inside the vehicle which likewise identifies upcoming events which require (for example speed restriction) or allow (for example cancellation of a speed restriction) an adjustment of the maximum speed on the basis of the known position of the vehicle and an upcoming route section. Both the first detection unit E1 and the second detection unit E2 are configured in such a manner that they can identify the location of the upcoming relevant event, that is to say also the level of the maximum permitted limit speed applicable from this location, and can forward it to the functional unit FE.

As soon as relevant data e1 and/or e2 relating to the location of an upcoming relevant event and the level of the maximum permitted limit speed from this location are available to the functional unit FE, the functional unit FE can, first of all, determine the maximum speed at the location of the upcoming event, possibly taking into account a driver specification.

On the basis of available relevant data, for example the relative speed between the vehicle and the determined maximum speed, the distance to the relevant object or event and/or a determined deceleration strategy, the functional unit FE causes the output of a request signal at a defined time by means of a corresponding signal of to a display operating unit ABE. The display operating unit ABE comprises a notification system HS and an operating element BE. For example, the functional unit FE causes the output approximately at the time at which a determined deceleration strategy would have to be implemented, with the result that the determined new maximum speed is achieved at the location of the upcoming event.

The operating element BE which can be used by the driver to confirm the request notification is configured in such a manner that the driver can request a manual adjustment of the maximum speed or desired speed +v− at those times at which no request notification is output.

Only when the driver confirms the request signal by actuating the operating element BE upon output of the request notification does the display operating unit ABE transmit a corresponding "permission" signal z back to the functional unit FE. The functional unit FE then begins to initiate the automatic adjustment of the maximum speed and, according to the new maximum speed, an adjustment of the speed regulation in order to achieve the new maximum speed at the location of the relevant event.

If the functional unit FE determines that, at the time at which it wishes to initiate the request notification, the operating element BE is actuated for the purpose of manually influencing the maximum speed +v−, the functional unit FE suppresses the initiation of the request notification or the output of the request notification. Only when the functional unit FE determines that there is no longer any actuation of the operating element for the purpose of manually influencing the maximum speed does the functional unit cause the output of the request notification—possibly taking into account further conditions—by transmitting the signal of to the notification system HS.

As a result of such a configuration of a longitudinally guiding driver assistance system, the automatic speed adjustment following manual permission is carried out in a more transparent manner. The risk of errors is also considerably reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A longitudinally guiding driver assistance system of a motor vehicle, comprising:
   a controller configured to regulate the speed of the motor vehicle based on a set maximum speed;
   a detection system configured to identify an upcoming speed restriction that implicates a first new maximum speed;
   a notification system configured to output an automatic speed change request to a driver in response to the identification of the upcoming speed restriction, the automatic speed change request requesting adjustment of the set maximum speed to the first new maximum speed; and
   an operating element configured to:
      output a permission signal that accepts the automatic speed change request when the operating element is actuated while the automatic speed change request is output, and
      output a manual adjustment signal that identifies a second new maximum speed when the operating element is actuated while the automatic speed change request is not output,
   wherein the controller is further configured to:
      automatically adjust, at a defined time and in response to the permission signal, the set maximum speed to the first new maximum speed when the operating element is actuated while the automatic speed change request is output, and
      adjust the set maximum speed to the second new maximum speed in response to the manual adjustment signal when the operating element is actuated while the automatic speed change request is not output.

2. The longitudinally guiding driver assistance system as claimed in claim 1, wherein the defined time is before the upcoming speed restriction is reached.

3. The longitudinally guiding driver assistance system as claimed in claim 1, wherein the controller is further configured to suppress the automatic speed change request when, prior to the output of the automatic speed change request, the operating element is detected as being actuated so as to output the manual adjustment signal.

4. The longitudinally guiding driver assistance system as claimed in claim 3, wherein the controller further is configured to subsequently cause the output of the automatic speed change request after the detected actuation of the operating element is concluded.

5. The longitudinally guiding driver assistance system as claimed in claim 1, wherein the controller is further configured to:

suppress the automatic speed change request when the operating element is detected as being actuated so as to output the manual adjustment signal, and subsequently cause the output of the automatic speed change request after the detected actuation of the operating element is concluded.

6. The longitudinally guiding driver assistance system as claimed in claim 5, wherein the automatic speed change request is output at a defined interval of time after the detected actuation of the operating element is concluded.

* * * * *